(12) United States Patent
Mazzuca et al.

(10) Patent No.: US 10,149,166 B2
(45) Date of Patent: Dec. 4, 2018

(54) VERIFYING A CERTIFICATE

(71) Applicant: BlackBerry Limited, Waterloo (CA)

(72) Inventors: Elliott Michael Guy Mazzuca, Etobicoke (CA); Chang Fung Yang, Mississauga (CA); Jason Songbo Xu, Toronto (CA); Chi Chiu Tse, Markham (CA)

(73) Assignee: BlackBerry Limited, Waterloo (CA)

( * ) Notice: Subject to any disclaimer, the term of this patent is extended or adjusted under 35 U.S.C. 154(b) by 119 days.

(21) Appl. No.: 14/995,932

(22) Filed: Jan. 14, 2016

(65) Prior Publication Data

US 2017/0208469 A1    Jul. 20, 2017

(51) Int. Cl.
| | |
|---|---|
| *H04W 12/08* | (2009.01) |
| *H04L 9/32* | (2006.01) |
| *H04L 29/06* | (2006.01) |
| *H04W 12/06* | (2009.01) |
| *H04W 88/02* | (2009.01) |

(52) U.S. Cl.
CPC ........... *H04W 12/08* (2013.01); *H04L 9/3268* (2013.01); *H04L 63/0272* (2013.01); *H04L 63/0823* (2013.01); *H04L 63/101* (2013.01); *H04L 2209/80* (2013.01); *H04W 12/06* (2013.01); *H04W 88/02* (2013.01)

(58) Field of Classification Search
CPC ..................................................... H04W 12/08
USPC ............................................................. 726/7
See application file for complete search history.

(56) References Cited

U.S. PATENT DOCUMENTS

| | | | |
|---|---|---|---|
| 6,996,711 | B2 | 2/2006 | Patterson et al. |
| 7,444,508 | B2 | 10/2008 | Karjala et al. |
| 7,448,080 | B2 | 11/2008 | Karjala et al. |
| 8,077,689 | B1 | 12/2011 | Jones et al. |
| 9,055,059 | B1 | 6/2015 | Bhalerao et al. |
| 9,686,081 | B2 * | 6/2017 | Wang ................... H04L 9/3263 |
| 2004/0093492 | A1 | 5/2004 | Daude |
| 2004/0268148 | A1 | 12/2004 | Karjala et al. |
| 2005/0120206 | A1 | 6/2005 | Hines et al. |
| 2005/0262086 | A1 | 11/2005 | Ta et al. |

(Continued)

FOREIGN PATENT DOCUMENTS

| | | |
|---|---|---|
| EP | 1657883 | 5/2006 |
| EP | 1494429 | 5/2012 |
| EP | 2264952 | 10/2013 |

OTHER PUBLICATIONS

Extended European Search Report issued in European Application No. 17150487.1 dated Apr. 12, 2017.

*Primary Examiner* — Christopher J Brown
(74) *Attorney, Agent, or Firm* — Fish & Richardson P.C.

(57) ABSTRACT

Systems, methods, and software can be used to verify a certificate. In some aspects, a request to connect to a Virtual Private Network (VPN) server is received from an application on a mobile device. A certificate of the VPN server is obtained at the mobile device. A device-level certificate verification for the certificate is performed. Whether an application-level certificate verification is provisioned for the application is determined. In response to determining that the application-level certification verification is provisioned, the application-level certificate verification for the certificate is performed. In response to verifying that the certificate passes the application-level certificate verification, the mobile device is connected to the VPN server.

20 Claims, 2 Drawing Sheets

(56) References Cited

U.S. PATENT DOCUMENTS

| | | |
|---|---|---|
| 2006/0048210 A1 | 3/2006 | Hildre et al. |
| 2012/0084184 A1* | 4/2012 | Raleigh ............ H04M 15/7652 |
| | | 705/30 |
| 2013/0132717 A1* | 5/2013 | Brand ................... H04L 9/0825 |
| | | 713/156 |
| 2013/0297933 A1* | 11/2013 | Fiducia ............... H04L 63/0853 |
| | | 713/156 |
| 2016/0344559 A1* | 11/2016 | Ma ........................ H04L 9/3263 |

* cited by examiner

VERIFYING A CERTIFICATE

BACKGROUND

The present disclosure relates to verifying a certificate. In some cases, a certificate can be used in an authentication process. For example, in a public-key infrastructure (PKI), a public key certificate can be used to prove the identity of an owner of the public key. The certificate can include information about the key, the owner's identity, and a digital signature of an entity that has verified the certificate's contents.

DESCRIPTION OF DRAWINGS

Like reference numbers and designations in the various drawings indicate like elements.

DETAILED DESCRIPTION

In some cases, an application on a device may initiate a VPN (Virtual Private Network) connection to perform certain tasks. For example, an enterprise file management application may establish a VPN connection with a VPN server, and transfer files over the VPN connections. In some cases, the VPN connection provides more security than a connection over public Internet. For example, the VPN connection may be encrypted to protect the content transferred over the VPN connection.

In some cases, during the establishment of the VPN connection, the identity of the VPN sever can be authenticated. In some cases, the authentication can be based on PKI protocols. For example, the authentication procedure can include verification of the certificate of the VPN server. In some cases, the certification verification procedures can include determining whether the certificate of the VPN server is valid. In some cases, the certificate verification procedures are provided at the device-level. For example, the device-level certificate verification can include validating the certificate based on security policies that are common for the device. In some cases, the device-level security policies can be based on a standardized security protocol, e.g., compliance with Request For Comment (RFC) standards.

Figure 1:
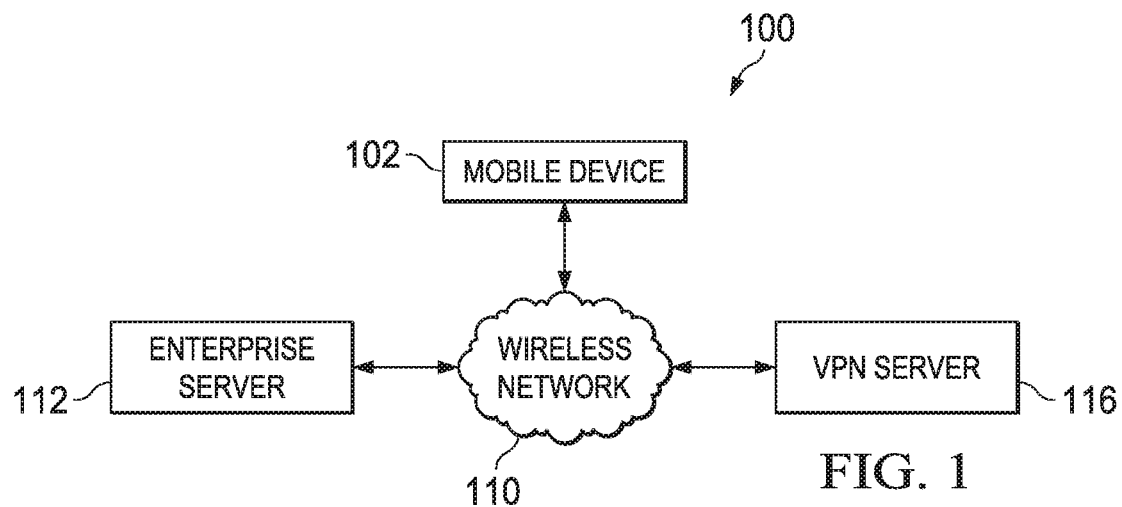
FIG. 1 is a schematic diagram showing an example communication system that verifies a certificate.
Figure 3:
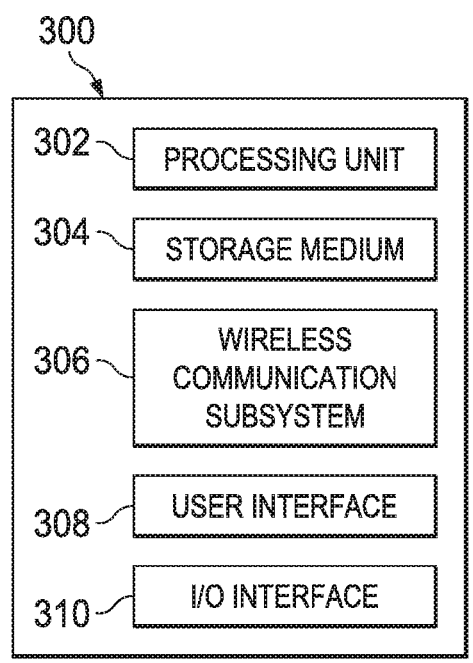
FIG. 3 is a block diagram illustrating an example mobile device.
Figure 2:
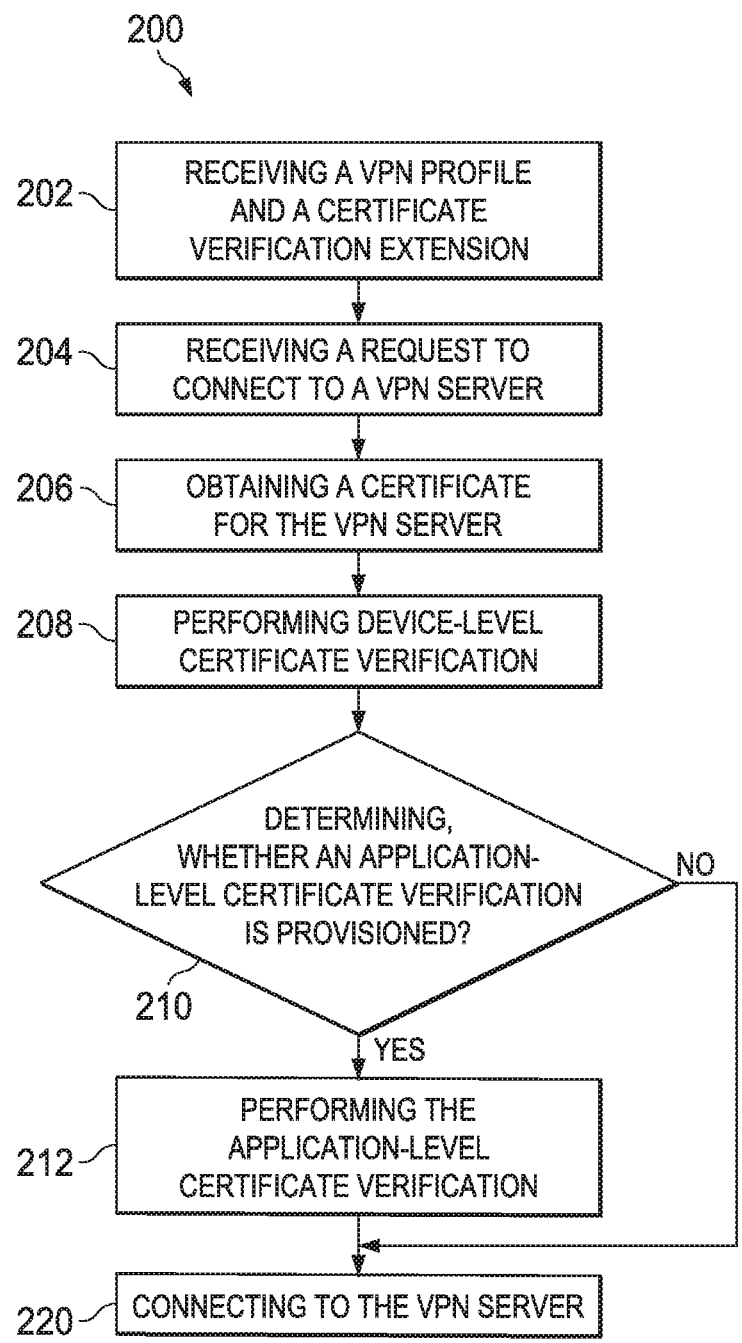
FIG. 2 is a flowchart showing an example process for verifying a certificate.

In some cases, an enterprise, e.g., the enterprise associated with the application that initiates the VPN connection, may provision proprietary security policies for certificate verifications. The proprietary security policies can be different than the standard based policies, and provide additional security for the authentication procedure. In some cases, the enterprise can include customized code in a certificate verification extension. The certificate verification extension can be pushed to the device and executed during a VPN connection establishment. In some cases, when the enterprise updates its security policy, an updated certificate verification extension can be pushed to the device to reflect the latest changes. FIGS. 1-3 and associated descriptions provide additional details of these implementations.

This approach can provide one or more advantages. For example, using the certificate verification extension, an enterprise can dynamically change the certificate verification process for its VPN connection without affecting the operations of other applications on the device.

FIG. 1 is a schematic diagram showing an example communication system 100 that verifies a certificate. The example communication system 100 includes a mobile device 102 that is communicatively coupled with an enterprise server 112 and a VPN server 116 through a wireless communication network 110.

The enterprise server 112 represents an application, set of applications, software, software modules, hardware, or combination thereof that can be configured to manage an enterprise application on the mobile device 102. In some implementations, the enterprise server 112 can include a mobile device management system. The mobile device management system can install, update, and manage the license of the enterprise application. In some cases, the enterprise server 112 can include an application store. In some cases, the enterprise server 112 can push a VPN profile to the mobile device 102. The VPN profile can be associated with the enterprise application that requests a VPN connection. In some cases, the enterprise server 112 can also push a certificate verification extension associated with the VPN profile to the mobile device 102. FIG. 2 and associated descriptions provide additional details of these implementations.

The VPN server 116 represents an application, set of applications, software, software modules, hardware, or combination thereof that can be configured to provide a VPN connection to the enterprise application on the mobile device 102. In some cases, the mobile device 102 can authenticate the identity of the VPN server 116 by verifying the certificate of the VPN server 116. In some cases, the certificate of the VPN server 116 can include a certificate chain. FIG. 2 and associated descriptions provide additional details of these implementations.

As shown in FIG. 1, the example communication system includes the wireless communication network 110. The wireless communication network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for the mobile device 102 to communicate. The base station may be distributed throughout the cellular network to provide a wide area of coverage. The base station directly communicates to one or a plurality of mobile devices, other base stations, and one or more core network nodes. The base station may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

The example communication system 100 includes the mobile device 102. In some cases, the mobile device 102 includes an enterprise application that can perform tasks over a VPN connection. In some cases, the mobile device 102 can verify the certificate of the VPN server 116 before completing the VPN connection. The certificate verification can include a device-level certificate verification and an application-level certificate verification that is specific for the enterprise application. FIG. 2 and associated descriptions provide additional details of these implementations.

Turning to a general description, a mobile device, e.g., the mobile device 102, may be referred to as mobile electronic device, user device, mobile station, subscriber station, portable electronic device, mobile communications device, wireless modem, or wireless terminal. Examples of a mobile device (e.g., the mobile device 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 2 is a flowchart showing an example process 200 for verifying a certificate. The process 200 can be implemented by any type of system or module that verifies a certificate. For example, the process 200 can be implemented by the mobile device 102 shown in FIG. 1. The process 200 can also be implemented by any other electronic device that initiates a VPN connection. The example process 200, shown in FIG. 2, can also be implemented using additional, fewer, or different operations, which can be performed in the order shown or in a different order.

The example process 200 begins at 202, where a VPN profile and a certificate verification extension are received by a device, e.g., the mobile device 102 shown in FIG. 1. In some cases, the VPN profile is associated with an application that requests VPN connections to a VPN server. In some cases, the VPN profile indicates one or more settings for the VPN connection. For example, the VPN profile can indicate the Internet Protocol (IP) address of the VPN server, the security protocol used to establishing the VPN connection, the login credentials, or other information. In some cases, the VPN profile can also include provisions for certificate verifications.

The certificate verification extension includes a software program that performs application-specific certificate verification when executed. In some cases, the certificate verification extension can be an executable file that is installed on the device. In some cases, an enterprise can program the application-specific certificate verification to perform certificate verification based on the enterprise's proprietary security policies.

In some cases, the VPN profile and the certificate verification extension can be pushed to the device by an enterprise server, e.g., the enterprise server 112 as shown in FIG. 1. In some cases, the enterprise server can push an application descriptor file, e.g., a .bar file or .apk file, to the device. The device can run the .bar file, which installs the certificate verification extension on the device.

In some cases, the VPN profile, the certificate verification extension, or a combination thereof can be updated by the enterprise server. For example, if an enterprise makes changes to its security policy, the enterprise can develop an updated application-specific certificate verification. The enterprise can instruct the enterprise server to push the updated certificate verification extension, e.g., via an updated application descriptor file, to the device.

From 202, the example process 200 proceeds to 204. At 204, a VPN connection is initiated by the device. In some cases, the VPN connection can be initiated by an application on the device. For example, the application can send a request to the operating system of the device for initiating a connection to a VPN server. In some cases, upon receiving the request, the device can send a connection request to the VPN server.

From 204, the example process 200 proceeds to 206. At 206, a certificate payload of the VPN server is received. In some cases, the certificate payload is sent to the device from the VPN server. In some cases, the VPN server sends a partial certificate payload to the device. The device can obtain the full certificate payload from a device store. For example, the device can use the information in the partial certificate payload to search for associated certificates in a device store, and build a full certificate payload based on the search results.

In some cases, the certificate payload can include the end entity (EE) certificate of the VPN server. Alternatively or in combination, the certificate payload can include a certificate chain of the VPN server. The certificate chain can include the EE certificate of the VPN server, and certificate authority (CA) certificates for one or more CAs in the certificate chain. The CAs in the certificate chain can include a root CA, one or more subordinate CAs, or a combination thereof.

From 206, the example process 200 proceeds to 208. At 208, the device-level certificate verification is performed. In some cases, the device-level certificate verification can be performed based on the security policies of the device. For example, the device-level certificate verification can be performed according to a standardized security protocol. In one example, the device-level certificate verification can be performed to check whether the certificates of the VPN server are compliant to Request For Comment (RFC) standards, e.g., RFC 4945, RFC 5280, etc.

If the device-level certificate verification fails, the VPN server is not authenticated and the VPN connection fails. If the device-level certificate verification succeeds, from 208, the example process 200 proceeds to 210. At 210, the device determines whether an application-level certificate verification is provisioned. In some cases, the determination is made based on the VPN profile. For example, the VPN profile can include a flag that specifies the name of a certificate verification extension. If the flag is set to true, then the application-level certificate verification is provisioned, and the example process 200 proceeds from 210 to 212. If the VPN profile does not include a flag specifying a certificate verification extension, or the flag is set to false, then the application-level certificate verification is not provisioned, and the example process 200 proceeds from 210 to 220.

At 212, the application-level certificate verification is performed. In some cases, the device can execute the certificate verification extension specified by the flag to perform the application-level certificate verification. In some cases, the device can pass the certificate payload of the VPN server, e.g., the certificate chain of the VPN server, to the certificate verification extension when the extension is executed. The certificate chain of the VPN server can be verified based on the application-specific security polices provisioned using the certificate verification extension.

In some cases, the application-specific security policies can include proprietary policies set by the enterprise, and therefore can be different than the device-level security polices, the standard-based policies, or a combination thereof. In one example, the application-specific security polices can include a black list of the CAs. In this example, the enterprise can list one or more CAs that are not trusted by the enterprise. If any of the CAs in the certificate chain matches a CA in the black list, the certificate is determined to be not valid and the certificate verification fails. Alternatively or in combination, the application-specific security polices can include a white list of the CAs. In this example, the enterprise can list one or more CAs that are trusted by the enterprise. In some cases, if the certificate chain includes any CAs in the white list, the certificate verification passes without further check. In some cases, if the certificate chain does not include any CAs in the white list, the certificate is determined to be not valid and the certificate verification fails.

Alternatively or additionally, the application-specific security polices can include polices related to key sizes, key usages, or a combination thereof. For example, the certificate verification may fail if the size of the key used by the VPN server is shorter than a threshold number.

In some cases, the output of the application-level certificate verification can be pass or fail. If the application-level certificate verification fails, the VPN connection fails. If the application-level certificate verification passes, the device proceeds to the next step of the VPN connection establishment. In some cases, the application-level certificate verification extension can return other outputs, e.g., unknown or timeout. In some cases, the certificate verification fails if the application-level certificate verification extension returns unknown or timeout.

In some cases, if the application-level certificate verification passes, the device can perform additional security procedures. Examples of the additional security procedures include Online Certificate Status Protocol (OCSP) check and certificate revocation list (CRL) check. For example, the device can contact an OCSP server, proxy CRL server, or a combination thereof to perform the additional security procedures.

If the certificate verification passes, the example process 200 proceeds from 212 to 220. At 220, the device connects to the VPN server.

FIG. 3 is a block diagram illustrating an example mobile device 300. The illustrated device 300 includes a processing unit 302, a computer-readable storage medium 304 (for example, ROM or flash memory), a wireless communication subsystem 306, a user interface 308, and an I/O interface 310.

The processing unit 302 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 302 may be configured to generate control information, such as a measurement report, or respond to received information, such as control information from a network node. The processing unit 302 may also be configured to make a Radio Resource Management (RRM) decision such as cell selection/reselection information or trigger a measurement report. The processing unit 302 can also include other auxiliary components, such as random access memory (RAM) and read-only memory (ROM). The computer-readable storage medium 304 can store an operating system (OS) of the device 300 and various other computer-executable instructions, logic or software programs for performing one or more of the processes, steps, or actions described above. In some cases, the computer-readable storage medium 304 can be transitory, non-transitory, or a combination thereof.

The wireless communication subsystem 306 may be configured to provide wireless communication for voice, data, and/or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple-input multiple-output (MIMO) transmissions. In some implementations, the receiver in the wireless communication subsystems 306 can be an advance receiver or a baseline receiver. Two receivers can be implemented with identical, similar, or different receiver processing algorithms.

The user interface 308 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 310 can include, for example, a universal serial bus (USB) interface.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, the data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including, by way of example, a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory, a random-access memory, or both. A computer can include a processor that performs actions in accordance with instructions and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including, by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps is not implied by the order in which they appear in the claims.

What is claimed is:

1. A method, comprising:
   receiving, from an application on a mobile device, a request to connect to a Virtual Private Network (VPN) server;
   obtaining, at the mobile device, a certificate of the VPN server;
   performing, at the mobile device, a device-level certificate verification based on the certificate according to a device-level security policy;
   in response to the device-level certificate verification being successful, determining, at the mobile device, whether an application-level certificate verification for the certificate of the VPN server is provisioned for the application;
   in response to determining that the application-level certification verification is provisioned, performing, at the mobile device, the application-level certificate verification based on the certificate of the VPN server according to an application-level security policy associated with the application, wherein the application-level security policy is different than the device-level security policy; and in response to verifying that the certificate passes the application-level certificate verification, connecting to the VPN server.

2. The method of claim 1, wherein whether the application-level certificate verification is provisioned is determined based on a VPN profile associated with the application.

3. The method of claim 2, wherein the VPN profile is stored at the mobile device prior to receiving the request to connect to the VPN server.

4. The method of claim 2, wherein the VPN profile is sent to the mobile device from an enterprise server prior to receiving the request to connect to the VPN server.

5. The method of claim 2, wherein the application-level certificate verification is performed by executing an extension specified by the VPN profile.

6. The method of claim 5, wherein the extension is sent to the mobile device from an enterprise server prior to receiving the request to connect to the VPN server.

7. The method of claim 1, wherein the application-level certificate verification is based on a black list of certificate authorities (CAs).

8. A mobile device, comprising:
a memory; and
at least one hardware processor communicatively coupled with the memory and configured to:
receive, from an application on the mobile device, a request to connect to a Virtual Private Network (VPN) server;
obtain, at the mobile device, a certificate of the VPN server;
perform, at the mobile device, a device-level certificate verification based on the certificate according to a device-level security policy;
in response to the device-level certificate verification being successful, determine, at the mobile device, whether an application-level certificate verification for the certificate of the VPN server is provisioned for the application;
in response to determining that the application-level certification verification is provisioned, perform, at the mobile device, the application-level certificate verification based on the certificate of the VPN server according to an application-level security policy associated with the application, wherein the application-level security policy is different than the device-level security policy; and
in response to verifying that the certificate passes the application-level certificate verification, connect to the VPN server.

9. The mobile device of claim 8, wherein whether the application-level certificate verification is provisioned is determined based on a VPN profile associated with the application.

10. The mobile device of claim 9, wherein the VPN profile is stored at the mobile device prior to receiving the request to connect to the VPN server.

11. The mobile device of claim 9, wherein the VPN profile is sent to the mobile device from an enterprise server prior to receiving the request to connect to the VPN server.

12. The mobile device of claim 9, wherein the application-level certificate verification is performed by executing an extension specified by the VPN profile.

13. The mobile device of claim 12, wherein the extension is sent to the mobile device from an enterprise server prior to receiving the request to connect to the VPN server.

14. The mobile device of claim 8, wherein the application-level certificate verification is based on a black list of certificate authorities (CAs).

15. A non-transitory computer-readable medium containing instructions which, when executed, cause a computing device to perform operations comprising:
receiving, from an application on a mobile device, a request to connect to a Virtual Private Network (VPN) server;
obtaining, at the mobile device, a certificate of the VPN server;
performing, at the mobile device, a device-level certificate verification based on the certificate according to a device-level security policy;
in response to the device-level certificate verification being successful, determining, at the mobile device, whether an application-level certificate verification for the certificate of the VPN server is provisioned for the application;
in response to determining that the application-level certification verification is provisioned, performing, at the mobile device, the application-level certificate verification based on the certificate of the VPN server according to an application-level security policy associated with the application, wherein the application-level security policy is different than the device-level security policy; and
in response to verifying that the certificate passes the application-level certificate verification, connecting to the VPN server.

16. The non-transitory computer-readable medium of claim 15, wherein whether the application-level certificate verification is provisioned is determined based on a VPN profile associated with the application.

17. The non-transitory computer-readable medium of claim 16, wherein the VPN profile is stored at the mobile device prior to receiving the request to connect to the VPN server.

18. The non-transitory computer-readable medium of claim 16, wherein the VPN profile is sent to the mobile device from an enterprise server prior to receiving the request to connect to the VPN server.

19. The non-transitory computer-readable medium of claim 16, wherein the application-level certificate verification is performed by executing an extension specified by the VPN profile.

20. The non-transitory computer-readable medium of claim 19, wherein the extension is sent to the mobile device from an enterprise server prior to receiving the request to connect to the VPN server.

* * * * *